United States Patent Office 2,731,439
Patented Jan. 17, 1956

2,731,439

REACTION PRODUCTS OF HYDROGENATED RUBBERY POLYMERS WITH ACRYLONITRILES

Rufus V. Jones and Peter J. Canterino, Bartlesville, Okla., assignors to Phillips Petroleum Company, a corporation of Delaware No Drawing. Application November 17, 1952, Serial No. 321,030

11 Claims. (Cl. 260—45.5)

This invention relates to novel, thermoplastic products prepared by the interaction of hydrogenated polymers and copolymers with acrylonitrile and methacrylonitrile. In a further aspect this invention relates to these reaction products which are thermoplastic rubbery materials.

Flexible rubbery materials have found wide use as oil resistant coverings, gaskets, and other products which come in contact with hydrocarbon solvents and which are subjected to widely varying temperature conditions. Hydrogenerated rubbery polymers have been found to have superior low temperature properties and moldability. These materials also are somewhat resistant to the action of hydrocarbon solvents but have a tendency to swell considerably when in contact with various solvents.

We have discovered that novel products can be prepared by the catalytically activated reaction of hydrogenated rubbery polymers and copolymers of conjugated dienes with acrylonitrile or methacrylonitrile. The resultant materials are thermoplastic and rubbery, and possess improved resistance to the action of hydrocarbon solvents. In addition, they possess the inherent advantages of the hydrogenated materials from which they are prepared, such as good low temperature properties and moldability. They are suitable for use in the preparation of oil resistant coverings, gaskets, hose, containers, boots, gloves and the like. Also, they are useful as components in adhesive compositions, coating compositions and the like. In the unpigmented state, the reaction products are translucent.

Each of the following objects is obtained by at least one of the following aspects of this invention.

An object of this invention is to provide translucent, thermoplastic, rubbery materials. A further object of this invention is to provide reaction products of partially hydrogenated synthetic rubber with acrylonitrile or methacrylonitrile. A further object of this invention is to provide the reaction product of partially hydrogenated polybutadiene and acrylonitrile. A further object of this invention is to provide a method for the production of these materials.

Other objects and advantages of this invention will be apparent, to one skilled in the art, upon reading the accompanying disclosure.

According to the present invention, hydrogenated rubbery polymers and copolymers are reacted with acrylonitrile or methacrylonitrile in the presence of a catalyst, and at a temperature in the range from 125 to 300° F., preferably 150 to 200° F. for a period of from one to 50 hours, preferably 2 to 10 hours. To provide efficient contacting of the reactants, the reaction mixture is preferably agitated.

While not desiring to limit this invention by a statement of the specific form of the reaction, it is believed that acrylonitrile and methacrylonitrile react with those carbon atoms alpha to an ethylenic linkage in the polymer, and the ratios of acrylonitrile and methacylonitrile used in the reaction are based upon this assumption.

Accordingly, the amount of acrylonitrile or methacrylonitrile employed is from 0.1 to 5 equivalents of said material per alpha carbon atom, the amount being governed by the degree of substitution desired. For any given degree of substitution we have found that it is generally desirable to employ an excess of acrylonitrile or methacrylonitrile. The resultant products contain from 0.1 to 16 per cent by weight nitrogen based upon the total weight of the polymer. Additional factors influencing the amount of nitrogen in the final product include the proportion of 1–4 and 1–2 addition in the polymer and the choice of monomers used in preparing the polymer.

The present invention is applicable to the interaction of acrylonitrile and methacrylonitrile with hydrogenated rubbery polymers and copolymers of conjugated dienes, said materials having unsaturation values in the range from 15 to 90 per cent, preferably from 20 to 50 per cent. The hydrogenated rubbery polymers and copolymers applicable as starting materials are prepared by the partial hydrogenation of rubbery polymers and copolymers prepared by polymerization of conjugated aliphatic diolefins or mixtures of such a conjugated diene with lesser amounts of one or more other compounds containing an active vinylidene group $CH_2=C<$ which are copolymerizable therewith. Representative dienes include butadiene, isoprene, piperylene, dimethylbutadiene, chloroprene and the like. The copolymers include aryl olefins such as styrene and homologues thereof such as alpha-methylstyrene, and the like, acrylic and substituted acrylic acids, esters and others. These rubbery polymers and copolymers of conjugated dienes can be hydrogenated by any suitable method to prepare the starting materials of the present invention. One suitable method for their production wherein said rubbery polymers are hydrogenated employing a catalyst such as finely divided nickel on kieselguhr is described in copending application, Serial No. 202,797, filed December 26, 1950, of R. V. Jones and C. W. Moberly, now abandoned.

Catalysts applicable for use in the present invention include organic peroxides and hydroperoxides. Typical organic peroxides and hydroperoxides for this reaction include benzoyl peroxide, acetyl peroxide, diisopropylbenzene hydroperoxide, [dimethyl(isopropylphenyl)hydroperoxymethane], tert-butylisopropylbenzene hydroperoxide, [dimethyl(tert-butylphenyl)hydroperoxymethane], isopropylbenzene hydroperoxide, [dimethyl(phenyl)hydroperoxymethane], and the like. The amount of catalyst employed will be in the range from 2 to 10 weight per cent of the rubbery polymer or copolymer being treated.

The interaction of hydrogenated rubbery polymers and copolymers of conjugated dienes with arcylonitrile or methacrylonitrile according to the manner of the present invention is effected with the starting material dissolved or dispersed in a suitable solvent such as cyclohexane or methylcyclohexane. Other solvents applicable for use include chlorinated solvents such as carbon tetrachloride, chloroform and the like, aromatics such as benzene, ethylbenzene, toluene and xylene. In one embodiment of the present invention the starting material comprises a solution [1] of a hydrogenated rubbery polymer or copolymer in cyclohexane or methylcyclohexane as obtained from a hydrogenation reaction. Prior to use in the present reaction said solutions are freed of hydrogenation catalyst.

Atmospheric pressures are usually satisfactory in conducting the present reaction. However, when low boil-

---

[1] Hydrogenated rubbery polymers and copolymers of conjugated dienes often form dispersions rather than solutions in the solvents disclosed.

ing solvents are used, pressures sufficient to prevent loss of said materials are employed.

Example I

A run was made wherein 250 grams of polybutadiene [1] latex was coagulated with isopropanol, washed with water and dried. No antioxidant was added to the rubber either before or after coagulation. The 250 grams of dried rubber was dissolved in 2.5 liters of methylcyclohexane and charged to a hydrogenator. The rubber solution was washed from its container into the hydrogenator with two 500 ml. portions of methylcyclohexane. 125 grams of reduced nickel hydroxide on kieselguhr catalyst [2] was then added and hydrogenation was effected at 350° F. and 500 p. s. i. g. hydrogen pressure for 4 hours. The catalyst was removed by magnetic separation and the product was drum dried. The product had an unsaturation value of 25.6 per cent.[3]

A run was made wherein 10 grams of hydrogenated polybutadiene rubber from the hydrogenation run described above was dissolved in 300 cc. of methylcyclohexane and charged to a reactor along with 5 grams of acrylonitrile and 0.8 grams of benzoyl peroxide. The mixture was heated for six hours at 158° F. at atmospheric pressure. The product was coagulated by pouring the mixture into an excess of isopropanol and was then washed with water and dried in a vacuum oven at 120° F. for 12 hours. The product was a translucent, thermoplastic, rubbery material which had a nitrogen content of 0.79 weight per cent. The swell [4] of the product was 102. The swell of the hydrogenated material was 126.

Example II

A solution of 10 grams of hydrogenated polybutadiene (35.9 per cent unsaturation) in 300 cc. of benzene was prepared. To this solution was added 5 grams of acrylonitrile and 0.8 gram of benzoyl peroxide. The solution was heated to reflux (approximately 180° F.) and maintained at that temperature for two hours. Gelation was observed after about ½ hour, the gel becoming less viscous at the end of the reaction. The polymer was recovered by pouring the solution into isopropyl alcohol, isolating, and drying overnight in a vacuum oven.

The product was similar in appearance to the starting material. It was thermoplastic and a portion was molded to give a disc two inches in diameter by 0.071 inches thick by maintaining it at 200° F. and 2700 p. s. i. g. for five minutes. This disc had a Shore hardness of 80 compared to 69 for hydrogenated polybutadiene. Volume swell in 70/30 isooctane/toluene was 310 per cent while the hydrogenated polymer disintegrated.

Example III

In another run, 10 grams of hydrogenated polybutadiene (70.4 per cent unsaturation) was dissolved in 300 cc. of benzene. To this solution were added 0.8 gram of benzoyl peroxide and 10 grams of acrylonitrile. The solution was refluxed for two hours at approximately 180° F. Gelation occurred early in the reaction but as the reaction progressed the gel redissolved. The polymer was recovered by pouring the solution into isopropyl alcohol and drying overnight in a vacuum oven at 122° F. The product was similar in appearance to the parent hydrogenated polymer. Is was thermoplastic and was molded to give a disc by maintaining at 200° F. and 2700 p. s. i. g. for five minutes. This disc had a Shore hardness of 54 compared to 24 for the starting material. Its volume swell in 70/30 isooctane/toluene was 410 while the Hydropol dissolved completely. The product had a nitrogen content of 1.7 per cent, equivalent to 6.5 per cent acrylonitrile.

As many possible embodiments may be made of this invention without departing from the scope thereof, it is to be understood that all matter herein set forth is to be interpreted as illustrative and not in a limiting sense.

We claim:

1. Thermoplastic rubbery material comprising the reaction product of a partially hydrogenated synthetic rubbery polymer, said polymer being a polymer of a conjugated diene which has had its unsaturation reduced to 15 to 90 per cent of theoretical by hydrogenation, with a compound selected from the group consisting of acrylonitrile and methacrylonitrile, said reaction product having from 0.1 to 16 weight per cent nitrogen based upon the total weight of said reaction product.

2. Thermoplastic rubbery material comprising the reaction product of hydrogenated polybutadiene, said polymer being a polymer of conjugated diene which has had its unsaturation reduced to 15 to 90 per cent of theoretical by hydrogenation, and acrylonitrile.

3. A process of preparing thermoplastic rubbery material comprising reacting a partially hydrogenated synthetic rubbery polymer, said polymer being a polymer of a conjugated diene which has had its unsaturation reduced to 15 to 90 per cent of theoretical by hydrogenation, with a compound selected from the group consisting of acrylonitrile and methacrylonitrile.

4. The process of claim 3 in which said polymer is a homopolymer of a conjugated diene.

5. The process of claim 3 in which said polymer is a copolymer of a conjugated diene and a compound containing a $CH_2=C<$ group.

6. The process of claim 3 in which said reaction is carried out in a solvent in the presence of an organic peroxide catalyst.

7. The process of claim 6 in which said reaction is carried out at a temperature of 125 to 300° F.

8. A process of preparing thermoplastic rubbery material comprising mixing with a solvent a partially hydrogenated polymer of a conjugated diene the unsaturation of which has been reduced to 15 to 90 per cent of theoretical by hydrogenation, contacting said mixture with 0.1 to 5 equivalents per carbon atom which is alpha to an ethylenic linkage in said polymer of a compound selected from the group consisting of acrylonitrile and methacrylonitrile at a temperature of 125 to 300° F. in the presence of an organic peroxide catalyst, said catalyst being present in an amount of 2 to 10 weight per cent based upon the hydrogenated polymer, and recovering the thus treated product.

9. A process of preparing thermoplastic rubbery material comprising mixing with a solvent a partially hydrogenated polymer of a conjugated diene the unsaturation of which has been reduced to 15 to 90 per cent of theoretical by hydrogenation, contacting said mixture with 0.1 to 5 equivalents per carbon atom which is alpha to an ethylenic linkage in said polymer of a compound selected from the group consisting of acrylonitrile and methacrylonitrile at a temperature of 150 to 200° F. in the presence of an organic peroxide catalyst, said catalyst being present in an amount of 2 to 10 weight

---

[1] A 41 ML₄ polybutadiene rubber prepared in an emulsion polymerization recipe at 41° F.

[2] Total catalyst for the run was prepared by reducing 125 grams of commercial nickel hydroxide on kieselguhr catalyst in a hydrogen atmosphere and subsequently quenching with 1.5 liters of methylcyclohexane. The catalyst composition, i. e., exclusive of methylcyclohexane, contained approximately 75 weight per cent of nickel on a completely reduced basis.

[3] Unsaturation was determined by the method of Lee, T. S., Kolthoff, I. M., Mairs, M. A., "Determination of Unsaturation of Synthetic and Natural Rubbers," Journal of Polymer Science 3, 6684, (1948).

[4] Swell was measured in a 70/30 isooctane-toluene mixture at room temperature on a molded sample 2″ x 1″ x .060″. The sample was immersed for 3 days and the swell was then determined.

$$\frac{V_2-V_1}{V_1} \times 100 = \text{per cent swell} \quad (V_1 = \text{initial volume}, V_2 = \text{swelled volume}).$$

per cent based upon the hydrogenated polymer, and recovering the thus treated product.

10. The process of claim 3 in which said rubbery polymer has an unsaturation of 20 to 50 per cent of theoretical.

11. The process of claim 8 in which said polymer has an unsaturation of 20 to 50 per cent of theoretical.

References Cited in the file of this patent

UNITED STATES PATENTS

| | | |
|---|---|---|
| 2,123,599 | Fikentscher et al. | July 12, 1938 |
| 2,341,553 | Houtz | Feb. 15, 1944 |
| 2,614,089 | Harrison et al. | Oct. 14, 1952 |
| 2,620,324 | Coover et al. | Dec. 2, 1952 |